O. O. STORLE.
Cord Holder and Cutter for Grain-Binder.

No. 221,627.      Patented Nov. 11, 1879.

Witnesses:
Edwin G. Asmus.
Charles H. Hunter

Inventor:
Ole O. Storle
per S. S. Hunt
Attorney

UNITED STATES PATENT OFFICE.

OLE O. STORLE, OF MILWAUKEE, WISCONSIN, ASSIGNOR OF TWO-THIRDS OF HIS RIGHT TO J. G. FLINT, JR., OF SAME PLACE.

IMPROVEMENT IN CORD HOLDERS AND CUTTERS FOR GRAIN-BINDERS.

Specification forming part of Letters Patent No. 221,627, dated November 11, 1879; application filed September 6, 1879.

*To all whom it may concern:*

Be it known that I, OLE O. STORLE, of Milwaukee, in the county of Milwaukee, and in the State of Wisconsin, have invented certain new and useful Improvements in Cord Holders and Cutters for Grain-Binders, &c.; and I do hereby declare that the following is a full, clear, and exact description thereof.

My invention relates to improvements in devices for holding the end of the cord and cutting it at the proper time as the knot is being tied; and it consists in the device hereinafter fully described.

Figure 1:
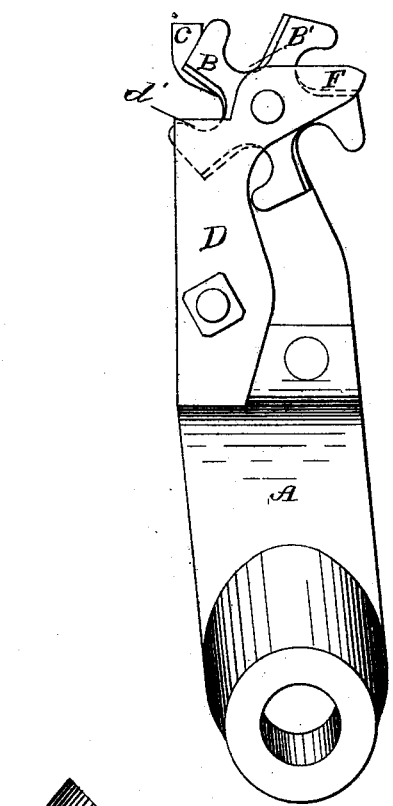
Figure 2:
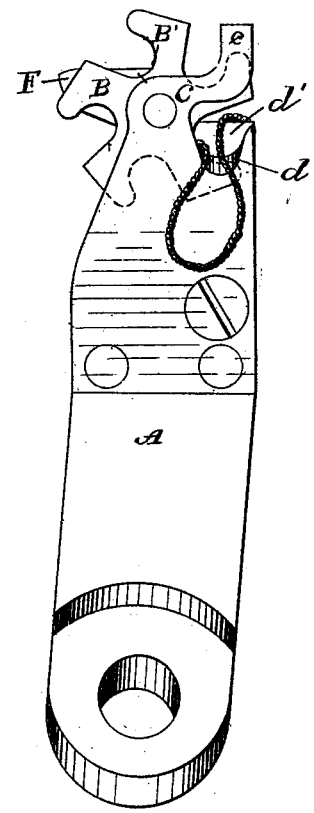
Figure 3:
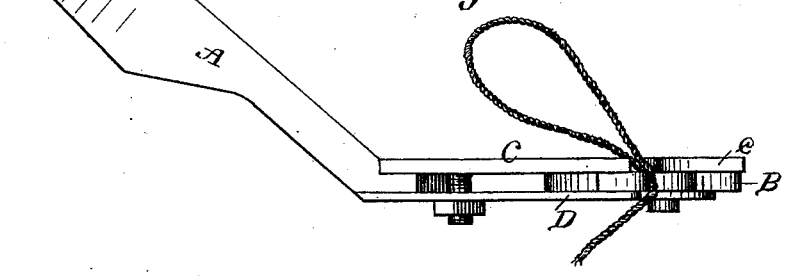

In the drawings, Figure 1 is a front view, Fig. 2 a rear, and Fig. 3 an edge, view, of my invention.

A is the shank by which the device is to be attached to the knot-tier in any suitable manner. To this shank a plate, C, is made fast on one side, and a spring-plate, D, on the other. These plates form an obtuse angle with the shank, and have pivoted between them, at their outer ends, a plate, B, having radial arms B', hollowed out on one side until they form hooks, and on the other side slightly concaved and provided with scissor-edges. The plate C has a cutting-edge, d, near its outer end, and terminates in a guard-arm, c. The plate D is slightly elastic, and is bolted up against the shank by a screw-bolt passed through the plate C. This plate is abruptly shouldered at d', and then projects in a generally-downward direction to form a clearer, F, for freeing the device from the loose ends of the cord.

Operation: My invention having been attached to the frame of the knot-tier in such a manner as to yield in the direction of the bundle to allow the proper slack for the knot, and so that when the loop is around the bundle the cord will rest on the cutting-edge, a turn of the plate for a distance equal to that from one arm to another will cause one of the arms to press the cord down upon the cutting-edge and sever it on that side, leaving the spool end clamped between the spring-plate and the arm which it partly encircles, ready for another loop, the hook on the arm serving to prevent the cord from slipping over its point. This may be continued indefinitely, a lever suitably connected with the tying mechanism serving to turn the plate B by contact with hook of one of the arms B' at the proper time, the guard or stop-arm c preventing a further revolution than is necessary for severing the cord.

It will be perceived that as the cord is clamped between the spring-plate and one of the arms, it will have a tendency to force the latter in the direction of the cutting-edge and insure its operation, and the continual rubbing of the arms against the cord on one side and the cutting of it on the other will keep the arms clear and prevent clogging.

What I claim is—

1. The combination of the cutting-plate having guard or stop arm with the plate having radial arms, as set forth.

2. The combination of the cutting-plate, plate having radial arms, and the elastic holding-plate, having an arm for clearing the radial arms of the cord ends as they revolve.

3. The combination of the cutting-plate C, having guard or stop arm c, the plate B, having radial hooked arms, and the elastic plate D, having clearing-arm, as and for the purpose set forth.

In testimony that I claim the foregoing I have hereunto set my hand this 30th day of August, 1879.

OLE O. STORLE.

Witnesses:
JAMES G. FLANDERS,
STANLEY S. STOUT.